United States Patent
Rosen

(10) Patent No.: US 10,225,722 B1
(45) Date of Patent: *Mar. 5, 2019

(54) SYSTEM AND METHOD FOR DELIVERING SHORT MESSAGE SERVICE TEXT TO CALL CENTERS

(71) Applicant: Neustar, Inc., Sterling, VA (US)

(72) Inventor: Brian S. Rosen, Mars, PA (US)

(73) Assignee: Neustar, Inc., Sterling, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/374,354

(22) Filed: Dec. 9, 2016

Related U.S. Application Data

(63) Continuation of application No. 14/808,458, filed on Jul. 24, 2015, now Pat. No. 9,521,240, which is a continuation of application No. 13/221,507, filed on Aug. 30, 2011, now Pat. No. 9,094,811.

(51) Int. Cl.
  *H04W 4/00* (2018.01)
  *H04W 4/90* (2018.01)
  *H04W 4/14* (2009.01)
  *H04M 1/725* (2006.01)
  *H04W 4/02* (2018.01)

(52) U.S. Cl.
  CPC ......... *H04W 4/90* (2018.02); *H04M 1/72536* (2013.01); *H04W 4/025* (2013.01); *H04W 4/14* (2013.01)

(58) Field of Classification Search
  CPC ......... H04W 4/22; H04W 4/025; H04W 4/14; H04M 1/72536
  USPC ............................. 455/404.1, 404.2; 370/328
  See application file for complete search history.

(56) References Cited

U.S. PATENT DOCUMENTS

| | | | |
|---|---|---|---|
| 7,580,977 B1 * | 8/2009 | Oran | G06Q 10/107 709/204 |
| 8,229,484 B2 | 7/2012 | Anisimov | |
| 8,271,777 B2 * | 9/2012 | Borisov | H04L 67/142 709/227 |
| 8,929,849 B1 * | 1/2015 | Dudziak | H04W 4/12 455/404.1 |
| 9,094,811 B1 * | 7/2015 | Rosen | H04L 51/10 |
| 9,521,240 B1 | 12/2016 | Rosen | |
| 2004/0176123 A1 * | 9/2004 | Chin | H04L 12/2854 455/521 |
| 2005/0054380 A1 | 3/2005 | Michaelis | |
| 2010/0003959 A1 | 1/2010 | Coppage | |
| 2011/0009086 A1 * | 1/2011 | Poremba | H04M 3/5116 455/404.1 |
| 2012/0320912 A1 | 12/2012 | Estrada | |

OTHER PUBLICATIONS

NENA, The 9-1-1 Association, Understanding NENA's i3 Architectural Standard for NG9-1-1, NENA Detailed Functional and Interface Standards for the NENA i3 Solution (TSD), NENA 08-003 v1, Jun. 14, 2011, Prepared by: National Emergency Number Association (NENA) Technical Committee Chairs, © Copyright 2011 NENA, 282 pages.

\* cited by examiner

*Primary Examiner* — Amancio Gonzalez
(74) *Attorney, Agent, or Firm* — Perkins Coie LLP

(57) ABSTRACT

A wireless emergency system that includes a mobile switching center, a short message service center that receives an emergency text message of a caller from the mobile switching center, and gateway in communication with the short message service center to route the emergency text message to a responsive public safety answering point as a tone message.

20 Claims, 9 Drawing Sheets

SYSTEM AND METHOD FOR DELIVERING SHORT MESSAGE SERVICE TEXT TO CALL CENTERS

CROSS-REFERENCE TO RELATED PATENT APPLICATIONS

The present application is a continuation of U.S. patent application Ser. No. 14/808,458, titled "System And Method For Delivering Text Messages To Call Centers" filed on Jul. 24, 2015, now allowed; which is a continuation of U.S. patent application Ser. No. 13/221,507, titled "System And Method For Delivering Short Message Service Text To Call Centers" filed on Aug. 30, 2011, and issued as U.S. Pat. No. 9,094,811 on Jul. 28, 2015, the entire content of each of which is herein expressly incorporated by reference.

FIELD OF THE INVENTION

The present invention relates to delivery of messages and other media to call centers, such as emergency call centers.

BACKGROUND

Cellular phone users (especially younger users) increasingly communicate via short message service (SMS) text messaging instead of placing telephone calls. Although emergency call systems (e.g., 9-1-1, 1-1-2, 9-9-9) do not support SMS, there is an expectation by many users that "text to 9-1-1" functionality has been incorporated into text messaging networks already.

In many circumstances, sending an SMS text message to 9-1-1 would be less effective or less efficient than placing a phone call. Of course, SMS text messages require that messages be typed so as to be communicated over a network, whereas a voice call occurs in real time. Accordingly, voice calls can be more effective for quickly communicating an emergency to an emergency call center. But, there are some emergency circumstances where texting is necessary, such as instances when a user may not be able to speak, but may be capable of sending text messages.

The infrastructure for known emergency call systems has been designed for handling voice calls, rather than a text-based interface. FIGS. 1A-1C are block diagrams that illustrate conventional arrangements of components in present emergency call systems for handling emergency voice calls. The block diagrams illustrate conventional signaling paths between landline, mobile, and voice over Internet protocol (VoIP) telephones and a public-safety answering point (PSAP), which is call center responsible for answering calls to an emergency telephone number for police, firefighting, and ambulance services.

FIG. 1A illustrates a conventional landline emergency call system 1a. Landline telephones 11 establish calls by connecting to a local exchange 21. The local exchange 21 is a telephony switch that performs switching functions for landline telephones connected to the local exchange 21. The local exchange 21 identifies calls addressed to 9-1-1 and routes these calls to a 9-1-1 selective router (SR) 70 as a typical voice call using the SS7 signaling protocol. The 9-1-1 SR 70 then routes the emergency call to PSAP 80 using multi-frequency (MF) tone signaling. Here, the 9-1-1 SR 70 also identifies the appropriate PSAP 80 to receive the call. To do so, the 9-1-1 SR 70 maintains a table assigning a PSAP to each of landline telephones 11. During an emergency call, a call taker at PSAP 80 may require the caller's location to dispatch emergency services to the caller.

In order for the PSAP 80 to determine the caller's location, the PSAP 80 can query the automatic location identification system (ALI) 92. The ALI 92 is one or more computers containing a database that stores the street address of every landline telephone.

FIG. 1B is a block diagram that illustrates a conventional signaling path between mobile user equipment (UE) and a PSAP. The conventional emergency call system for cellular telephone systems was developed to work within the already developed landline emergency call system 1a.

In the conventional cellular emergency call system 1b depicted in FIG. 1B, the UE 10 communicates with a mobile switching center (MSC) 20 through a base station (not shown). Typically, the UE 10 is a cellular telephone, smartphone, or the like. The MSC 20 is a server or a plurality of servers that performs switching and management functions for UEs connected to a cellular network. The MSC 20 identifies calls addressed to 9-1-1 and routes these calls to a mobile positioning center (MPC) 91. The MPC 91 is a server or plurality of servers dedicated to assisting placement of emergency calls. Upon being notified of a call addressed to an emergency number (9-1-1), the MPC 91 determines an appropriate PSAP 80 to receive the emergency call based on the UE's location (as discussed below). The MPC 91 then instructs the MSC 20 to route the call to 9-1-1 SR 70 as a typical voice call using the SS7 signaling protocol. The 9-1-1 SR 70 then routes the emergency call to the PSAP 80 using MF signaling.

The MPC 91 also allocates a 10 digit number to the UE 10. The number is called a "pseudoANI" or "pANI", which has an area code appropriate for the PSAP 80. The actual telephone number of the UE 10 cannot be used because the PSAP 80 does not support non-local area codes. The pANI is needed because a UE in a cellular network is mobile and may often be at a location where the telephone number associated with the UE is a non-local telephone number. The MPC 91 maintains a pool of such area-code appropriate pANIs for each PSAP. When a call arrives for the PSAP, one of the pANIs from the pool associated with the PSAP is allocated for use during the emergency call. When the call is over, the pANI is returned to the pool, and may be reused for another call to the same PSAP.

The MPC 91 and PSAP 80 are each connected to ALI 92. To request the caller's location, the PSAP 80 sends a query message to the ALI 92 using the pANI assigned to the call. The ALI 92 sends the query message to the MPC 91. The MPC 91 communicates with the PDE 93 in order to obtain the location of a UE. The PDE 93 is a cellular network element that obtains location measurements from the UE 10, such as global position system measurements, or from various forms of triangulation from the cellular towers to determine the latitude and longitude of the UE 10.

A rough location of a caller may also be determined using the cell ID, which includes the cell and sector currently serving the UE 10. Mobile emergency calls are typically routed based on the cell ID, and not necessarily on the closest PSAP to the user or the tower. A database that stores cell IDs and corresponding PSAPs is maintained at the MPC 91. The MPC 91 determines an appropriate PSAP to receive the emergency call by retrieving the PSAP 80 from the database based on the UE's serving cell ID.

FIG. 1C is a block diagram that illustrates a conventional signaling path between a VoIP telephone 12 and a PSAP. The conventional emergency call network for VoIP phone systems was also developed to work within the already developed landline emergency call network 1a.

In the conventional VoIP emergency call system 1c depicted in FIG. 1C, the VoIP telephone 12 communicates with a call server 22 through an Internet connection. The call server 22 is a server or a plurality of servers that performs switching functions for VoIP telephones connected within the VoIP telephone network. The call server 22 identifies calls addressed to 9-1-1 and routes these calls to a voice over IP positioning center (VPC) 50. The VPC 50 is a server or plurality of servers dedicated to receiving emergency calls from the call server 22 using VoIP. Upon receiving a call addressed to an emergency call center, the VPC 50 determines an appropriate PSAP 80 to receive the emergency call based on the UE's location (as discussed below). The VPC 50 then routes the call to an emergency services gateway (ESGW) 60. The ESGW 60 is a gateway that receives the emergency call using VoIP and routes the call to a 9-1-1 SR 70 as a typical voice call using the SS7 signaling protocol. The 9-1-1 SR 70 then routes the emergency call to the PSAP 80 using MF signaling.

The VPC 50 also allocates a pANI to the UE 10. As is the case with cellular phones, a pANI is needed because the actual telephone number of the VoIP telephone cannot be used because the PSAP 80 does not support non-local area codes. The pANI is needed because a VoIP telephone may be at a location where the telephone number associated with the VoIP telephone is a non-local telephone number.

To request the caller's location, the VPC 50 sends a query to the location information server (LIS) 94. The LIS 94 is one or more servers containing a database that stores the street address of every VoIP telephone. The VPC 50 and PSAP 80 are each connected to the ALI 92. The PSAP 80 can also query the caller's location. To do so, the PSAP 80 sends a query message to the ALI 92 using the pANI assigned to the VoIP telephone 92. The ALI 92 sends the query message to the VPC 50. The VPC 50 relays the query to the LIS 94 in order to obtain the location of a VoIP telephone 12.

The infrastructure for known emergency call systems has been designed for handling voice calls, rather than a text-based interface. As an exception, emergency 9-1-1 systems accommodate use of text telephones (TTY), also known as text devices for the deaf (TDD), to enable allows deaf persons to contact emergency call centers. TTYs are text devices that use conventional analog telephone lines, and encode text on an analog phone call using tones, such as Baudot tones. In this manner, TTYs use tones on regular voice calls to convey text on an emergency voice call. A TTY uses a Baudot code or another code such as ASCII, sent by a 45.45 bps binary frequency-shift-keyed scheme that is carrierless, half duplex, and without error protection. All emergency call centers have one or more TTYs (as required by the Americans with Disabilities Act), and many have the capability to receive TTY calls at every call taker's position in the call center, although the use of TTY by the deaf is currently being phased out with other advances in technology.

Since existing emergency call centers are not able to accept SMS communications, upgrading the centers themselves to provide "text-to-9-1-1" functionality would be expensive and would require years of time for deployment. Therefore, it is desirable to provide an arrangement that enables texting of SMS messages to PSAPs without requiring upgrades of the emergency call centers themselves.

Accordingly, certain embodiments of the present invention are directed to systems and methods for delivering SMS and other media to call centers, including emergency call centers, which utilize existing infrastructure. Embodiments of the invention can use TTYs in the PSAPs to provide SMS capability in the UEs by interworking the SMS message system with the TTY support system in the emergency call process, thus allowing a wireless caller to text to the PSAP in the same way the caller would text to anyone else, which then allows the PSAP to use its TTY in the same way as any other TTY call.

SUMMARY OF THE INVENTION

Accordingly, embodiments of the present invention substantially obviate one or more problems due to the limitations and disadvantages identified above.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the system and method for delivering short message service text to call centers includes a wireless emergency system including a mobile switching center, a short message service center that receives an emergency text message of a caller from the mobile switching center, and gateway in communication with the short message service center to route the emergency text message to a responsive public safety answering point as a tone message.

In another aspect, the system and method for delivering short message service text to call centers includes a gateway for routing a text message including a text message receiver that receives an emergency text message of a caller from a short message service center, a transcoder that exchanges text messages with the short message service center and exchanges tone messages with a responsive public safety answering point, the transcoder bi-directionally translating between text message and tone message formats, and a text message transmitter that transmits a reply text message to the caller that corresponds to a tone message received from the responsive public safety answering point.

In yet another aspect, the system and method for delivering short message service text to call centers includes a method for routing a text message including receiving an emergency text message of a caller, generating an emergency tone message corresponding to the emergency text message, and sending the emergency tone message to a responsive public safety answering point.

In yet another aspect, the system and method for delivering short message service text to call centers includes a wireless messaging system comprising a means for receiving text messages of a caller intended for a call center, and a gateway means in communication with the receiving means for routing selected text messages to a call center as a tone message.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the embodiments of the present invention, examples of which are illustrated in the accompanying drawings. Wherever possible, like reference numbers will be used for like elements.

Figure 1A:
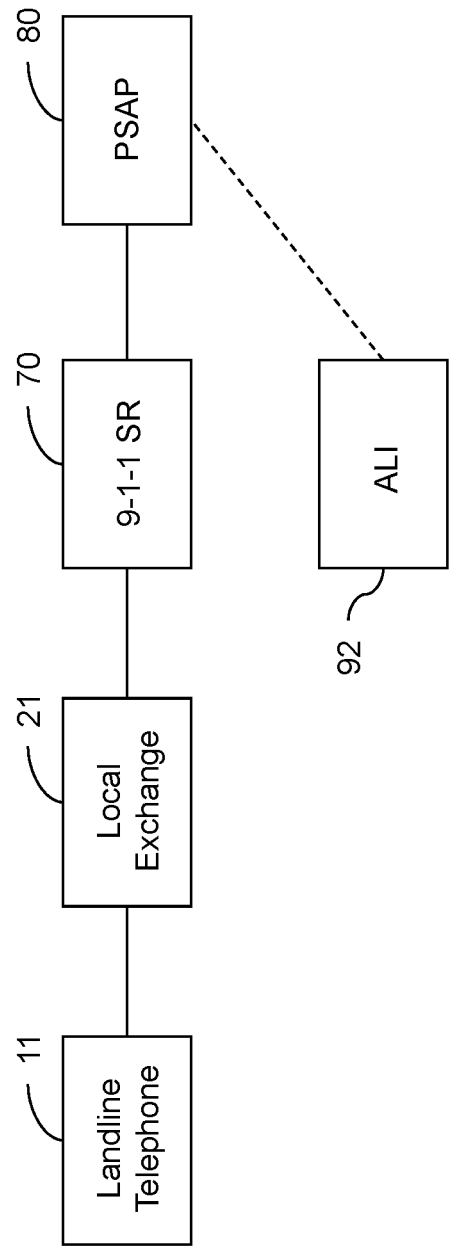
FIG. 1A-1C are block diagrams that illustrates conventional arrangements of components in an emergency call network for handling emergency voice calls.
Figure 1B:
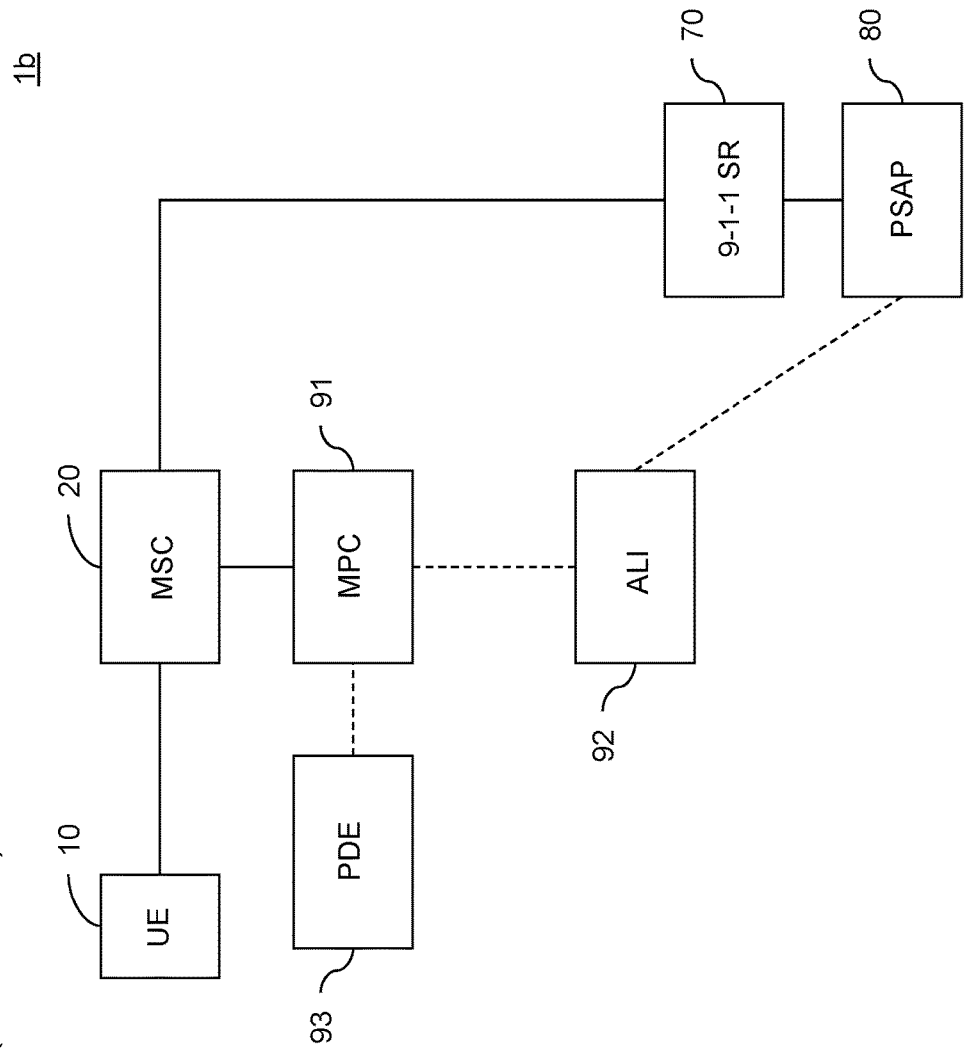
Figure 1C:
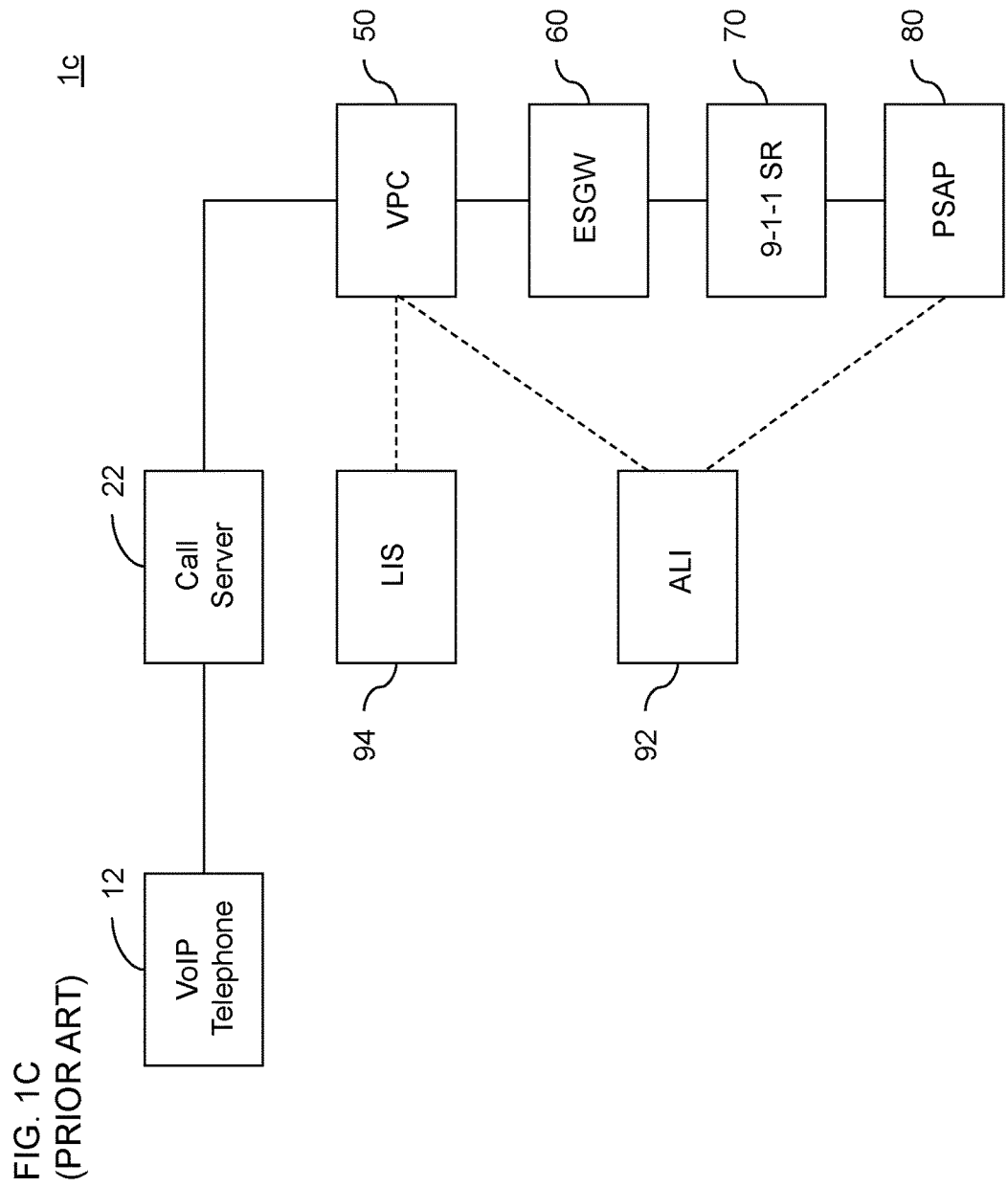
Figure 2A:
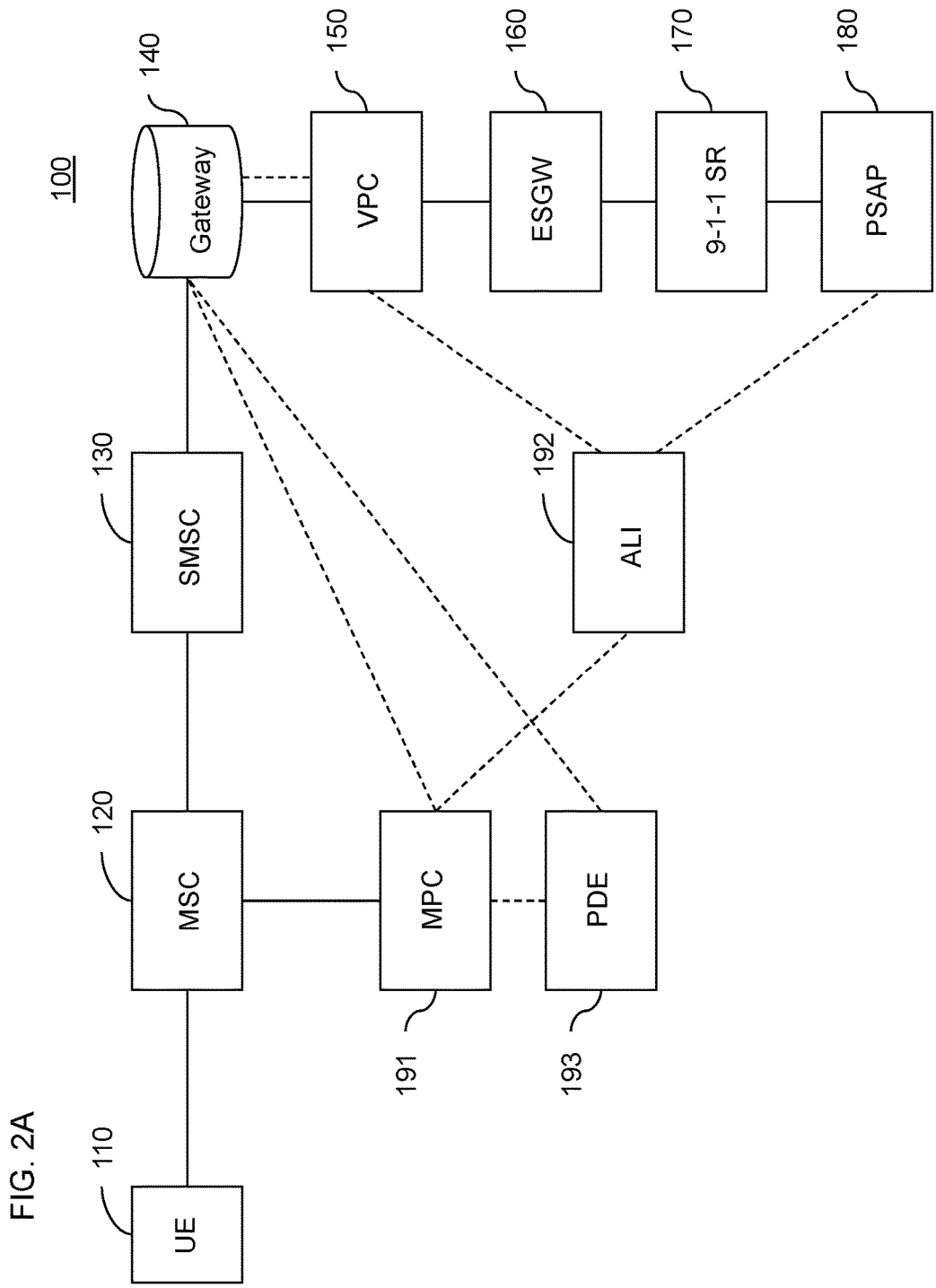
FIG. 2A-2D are block diagrams illustrating exemplary emergency call systems in accordance with embodiments of the present invention.

FIG. 2A is a block diagram that illustrates an exemplary emergency call system in accordance with an embodiment of the present invention.

In this embodiment of the present invention, the Gateway 140 is introduced to interconnect the SMS system with the cellular and VoIP emergency call systems. Accordingly, as shown in FIG. 2A, the exemplary emergency call system includes user equipment (UE) 110, mobile switching center (MSC) 120, short message service center (SMSC) 130, Gateway 140, voice over IP positioning center (VPC) 150, emergency services gateway (ESGW) 160, 9-1-1 selective router (SR) 170, PSAP 180, mobile positioning center (MPC) 191, automatic location identification system (ALI) 192, and position determining equipment (PDE) 193.

Emergency call system 100 in accordance with an embodiment of the present invention as depicted in FIG. 2A includes Gateway 140 for establishing and maintaining text communication sessions with the PSAP 180 (and as described below, for providing other media from a UE to the PSAP). During a communication session, SMS text messages are sent to the PSAP 180 using a tone format. The Gateway 140 is a computer having hardware and software components to transmit and receive text messages as well as transcode the SMS text messages to a tone format that can be transmitted on an audio call session with the PSAP 180. A more detailed description of Gateway 140 can be found in the discussion of FIG. 3. Unlike conventional SMS gateways, Gateway 140 interfaces with an emergency call network (or other call center) to transmit data on an audio channel using tones.

FIG. 2A additionally includes SMSC 130 for delivering SMS text messages from the UE 110 to the Gateway 140. Although SMSCs are known elements of a wireless network for delivering SMS text messages between user UEs, in accordance with an embodiment of the invention, the SMSC is incorporated into the emergency call system. In accordance with an embodiment of the invention, MSC 120 is provisioned to translate the '911' dial string to the address of Gateway 140, typically a 10 digit telephone number. This telephone number will route SMS text messages in the wireless network to the proper SMSC 130, which will route it to Gateway 140. The MSC 120 performs similar translation for other "short codes" (e.g., 311 and *86) for reaching other call centers. The MSC 120 contains a translation table that translates short codes to 10 digit TNs.

As depicted in FIG. 2A, an SMS text message originating at UE 110 is received by the MSC 120. If the text message is addressed to 9-1-1, the MSC 120 translates the 9-1-1 code to a telephone number of Gateway 140 and sends the emergency SMS text message to the SMSC 130. The SMSC 130, recognizing the telephone number of the Gateway 140, can send the message to the Gateway 140. In other words, the emergency text message can be routed to Gateway 140 through the SMSC 130. Upon receiving the emergency SMS text message, Gateway 140 can determine whether the emergency SMS text message is an initial message to establish a communication session or is otherwise part of an existing communication session with the PSAP 180. If Gateway 140 determines that the emergency text message is an initial message, then a communication session with the PSAP 180 is established. The caller is identified by the telephone number associated with the UE 110. When a caller sends an initial message, a communication session is not yet established. Gateway 140 maintains a table of communication sessions with the telephone number of the caller for each session. When a message is received, the Gateway 140 checks the telephone number of the message sender against the telephone numbers of the existing communication sessions. If this is an initial message, there will not be a match. Gateway 140 then establishes a new communication session and associates the caller's telephone number with that session. Subsequent messages to and from the same caller will be identified as being within this session.

In accordance with an embodiment of the invention, the "session" includes the audio call to the PSAP 180, such as a VoIP call. While a voice call has a definite beginning and ending, SMS text messages do not. Rather, each SMS text message is an independent exchange of information. Accordingly, a session starts when a first message from a new telephone number is received at Gateway 140, and ends when the PSAP 180 terminates the audio call. If another text message from the same telephone number is received by the Gateway 140 after the termination of the audio call, it is treated as a first message by Gateway 140 and a new communication session is established.

The location of the caller is important in emergency situations. At the outset, the Gateway 140 utilizes the caller's location information to determine the appropriate PSAP to receive the initial emergency text message. Several techniques are available for Gateway 140 to determine location information and provide the information to the PSAP. For example, Gateway 140 can query the wireless network for location information of the caller, such as the cell ID, including the cell and sector currently serving the UE 110. In this example, Gateway 140 may contain or connect to a database (not shown) that stores cell IDs and corresponding PSAPs. In conventional emergency call networks, a database that stores cell IDs and corresponding PSAPs is maintained at the MPC 191. In an emergency call network in accordance with an embodiment of the invention, a copy of the database maintained at MPC 191 also may be maintained at Gateway 140 to determine an appropriate PSAP for responding to an emergency text message. Alternatively, instead of maintaining a copy of the database, the Gateway 140 can access the database maintained at the MPC 191.

When Gateway 140 queries the wireless network, a query message is transmitted to the MPC 191. Upon receipt of the query message, the MPC sends the query message to the PDE 193. The PDE 193 is a wireless network element that obtains location measurements from the UE 110, such as global position system measurements, or from triangulation mechanisms from multiple cellular towers to determine the latitude and longitude of the UE 110. Alternatively, Gateway 140 can send the query message directly to the PDE 193 rather than sending the query message through the MPC 191. Gateway 140 can query the wireless network for the location information of the caller upon receiving the emergency SMS text message, or at any point during the communication session with the PSAP 180.

Latitude and longitude information associated with the caller also or alternatively can be used to determine an appropriate PSAP to receive an initial emergency message. Gateway 140 may include mapping software that superimposes a set of polygons that represent the service boundary of each PSAP on a map. Using the latitude and longitude information associated with a caller, the mapping software can determine the presence of the caller within one of the polygons, and an appropriate PSAP can be identified.

The PSAP 180 can also request the caller's location. To request the caller's location, the PSAP 180 sends a query message to the ALI 192 (using the pANI assigned to establish the communication session to identify the caller, see below). The ALI 192 can route the query message to the VPC 150. In turn, the VPC 150 routes the query to Gateway 140. In turn, the Gateway 140 queries the wireless network, as discussed above. Alternatively, the ALI 192 can send the query message to the MPC 191 or PDE 193 directly. Once received, the PSAP 180 can display the location information of the caller on the call taker's workstation (not shown) on a map or text containing an approximate street address.

In these examples, location information is returned to the requester using the same path used to send the query message. The location information can be requested once or repeatedly during a communication session. The caller's location information can be the caller's actual location or the location of the cell and sector currently serving the caller.

To establish an audio call, such as a VoIP call, with a PSAP, the Gateway 140 selects a "pseudo ANI" (or "pANI"), which is a telephone number, from a pool of telephone numbers that can be maintained at Gateway 140 for each PSAP. Gateway 140 establishes an audio call, such as a voice over internet protocol (VoIP) call, to 9-1-1, using the pANI as the calling party number. As discussed above, Gateway 140 maintains a table of communication sessions with the telephone number of the caller for each session. This table can also include the pANI used for each communication session.

In the embodiment of the invention as depicted in FIG. 2A, Gateway 140 transcodes the signaling between UE 110 and PSAP 180 via an audio call, such as a VoIP audio call. In a VoIP implementation, the communication session between the Gateway 140 and the PSAP 180 is routed through the VPC 150, ESGW 160, and 9-1-1 SR 170. The VPC 150 routes the call to an emergency services gateway network, which routes the call to ESGW 160 based on the pANI. Next, the ESGW 160 routes the call to a 9-1-1 SR 170 based on the pANI. Lastly, the 9-1-1 SR 170 can route the call to the PSAP 180 based on the pANI.

As is known, the PSAP 180 answers the call and directs it to one of its call takers. Once the communication session has been established, the Gateway 140 can send the emergency SMS text message to a TTY-configured PSAP 180 using tones such as Baudot tones. The call taker, upon hearing the tones, connects its TTY to the communication session. The tones are rendered as text to the call taker. The call taker can reply to the emergency SMS text message using TTY. Accordingly, the PSAP 180 can receive Baudot tone messages and can transmit reply messages in the form of Baudot tone messages. The Gateway 140, upon receipt of the reply tone message can generate a reply SMS text message corresponding to the reply tone message. Once the reply SMS text message is generated, it can be routed back to the UE 110.

During the communication session, the caller and the call taker can send messages to each other. Each message from the caller is received as an SMS text message by the Gateway 140, and routed to the PSAP 180 in the same manner as with the initial message. The Gateway 140 routes SMS messages from the caller, which are identified by the telephone number of the caller, to the PSAP 180 using Baudot tones on the communication session established for the caller. The PSAP 180 receives these tone messages from the caller using TTY. The call taker can reply to the caller using reply tone messages. The reply tone messages of the call taker can be routed to the Gateway 140 on the communications session previously established for this caller. The reply tone messages are received by the Gateway 140 as Baudot tones. The Gateway 140 can generate reply SMS text messages corresponding to the reply tone messages that are sent to the caller's UE 110.

Once the call taker determines that the communication session should be terminated, the PSAP 180 terminates the communication session with the Gateway 140. Upon receipt of a termination message from the PSAP 180, the Gateway 140 can release the pANI for use in another call. Any subsequent SMS text messages from the same caller will be treated as a new conversation, and a new communication session can be established.

In addition to being able to send a SMS text message to the PSAP 180, in accordance with an exemplary embodiment, the caller additionally can send a multimedia message service (MMS) message, including a picture or video clip, to 9-1-1. The Gateway 140 receives the MMS message in a similar manner as an SMS text message. A MMS message can also contain text content that accompanies the picture or video clip. The text content of a MMS message can be routed to the Gateway 140 using Baudot tones, as described above for a SMS message.

To send the media portion of the MMS message to the PSAP 180, the Gateway 140 can route a media alert message to the PSAP 180 using Baudot tones on the communication session that alerts the PSAP 180 to the availability of the picture or video clip. The Gateway 140 may include an Internet server that hosts multimedia to be retrieved by the call taker at PSAP 180. The media alert message can contain a retrieval code, URL, or other mechanism for accessing the picture or video clip from the Gateway 140. The call taker at PSAP 180 can view the picture or video clip at the call taker's computer station using a web browser, for example.

Because some PSAPs may not be configured for accessing a picture or video message, the Gateway 140 contains a list of PSAPs configured to retrieve multimedia. When the PSAP cannot retrieve multimedia messages, the Gateway 140 can send the caller a "no-media" message informing the caller that the PSAP cannot accept pictures or video.

Although an emergency message typically originates with a caller, in an exemplary embodiment, the call taker can also establish a communication session to communicate with a caller. For example, if a communication session is disconnected due to a loss in cellular service of the caller, the call taker can seek to establish a new communication session. In that manner, the call taker can re-establish a communication session by placing an audio telephone call to the associated Gateway 140. After the Gateway 140 acknowledges the communication session with the PSAP 180, the PSAP 180 sends an identifying code, such as the telephone number of the caller it wishes to communicate with. Once again, information is communicated between the Gateway 140 and the PSAP 180 using Baudot tones. The Gateway 140 can acknowledge receipt of the identifying code by sending a message to the PSAP 180. The PSAP 180 can send a message intended for the caller using its TTY. The Gateway 140 receives the messages as Baudot tones. As discussed above, the Gateway 140 sends an SMS message to the caller containing the content of the tone message received by the Gateway 140 from the PSAP 180.

If the caller receives a message originated from PSAP 180 and chooses to reply, the SMS text reply message can be received by the Gateway 140 and can be routed to the PSAP 180 using a Baudot tone message. As discussed above, the caller communicates using SMS text messages, and the call taker communicates using TTY, in which the Gateway 140 bidirectionally transcodes between the two message formats. Once the call taker at PSAP 180 terminates the communication session with the Gateway 140, any subsequent messages from the caller will prompt a message from the Gateway 140 that the communication session has ended. Alternatively, a new communication session can be established.

Figure 2B:
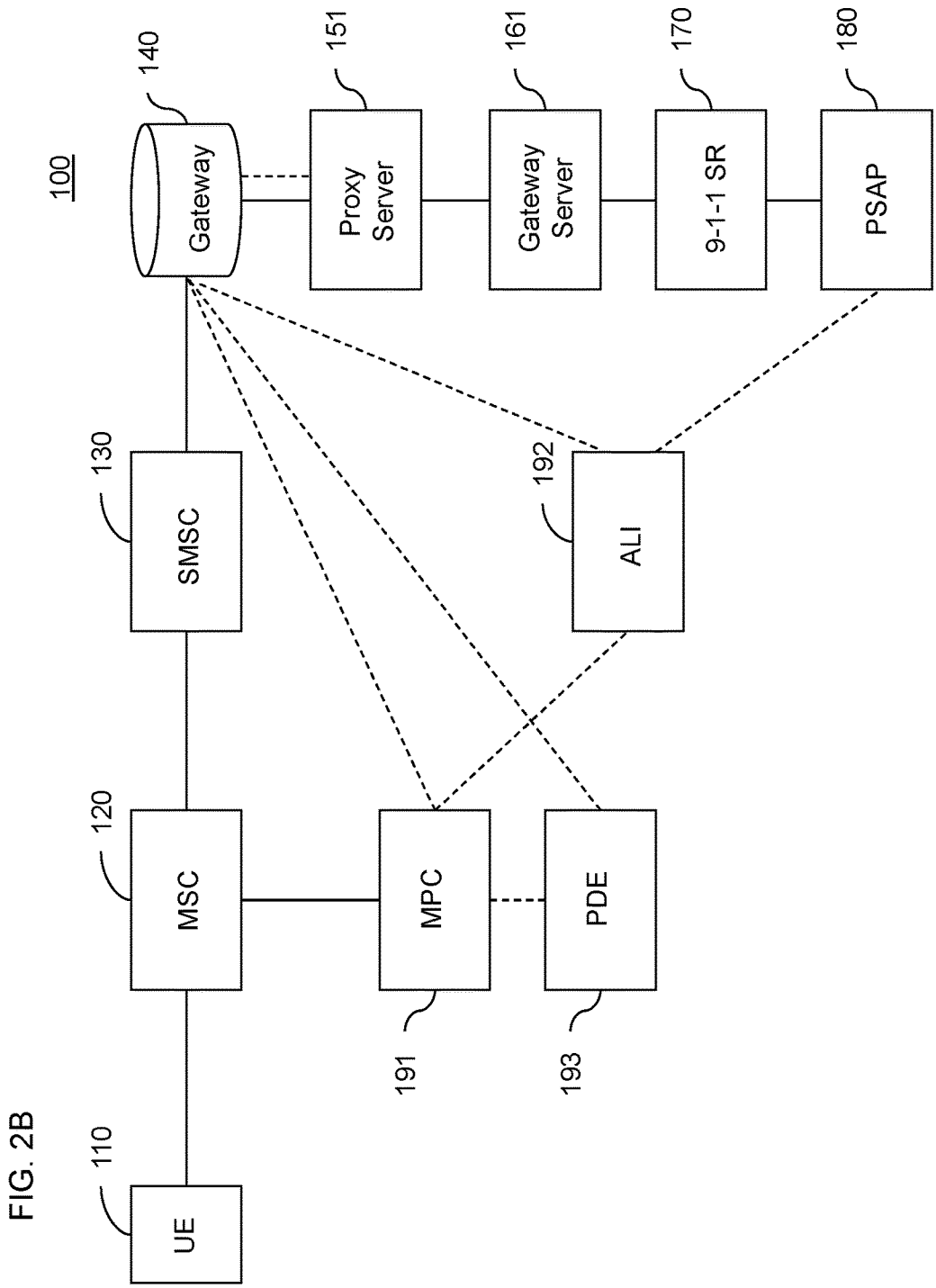
Figure 2C:
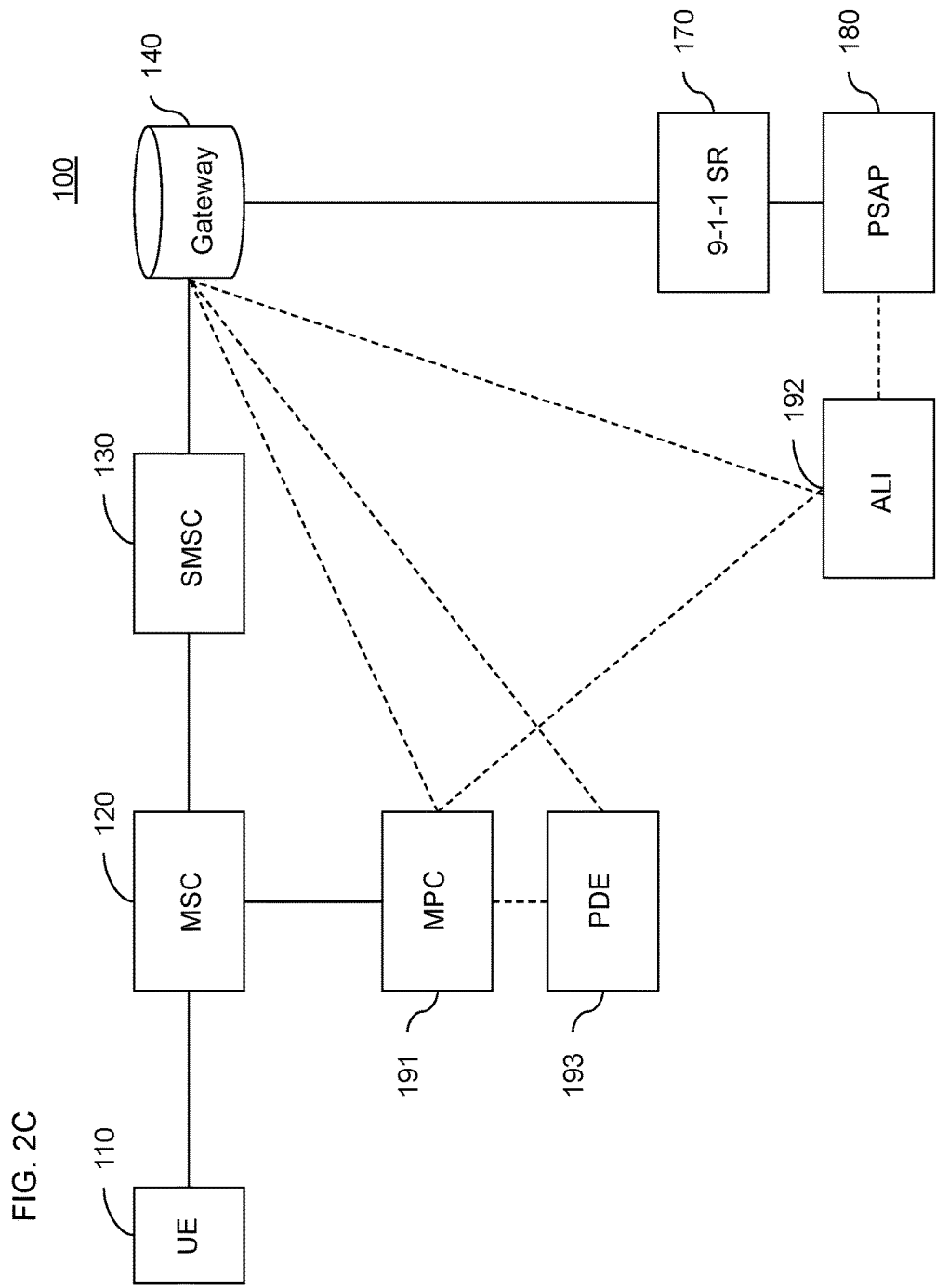
Figure 2D:
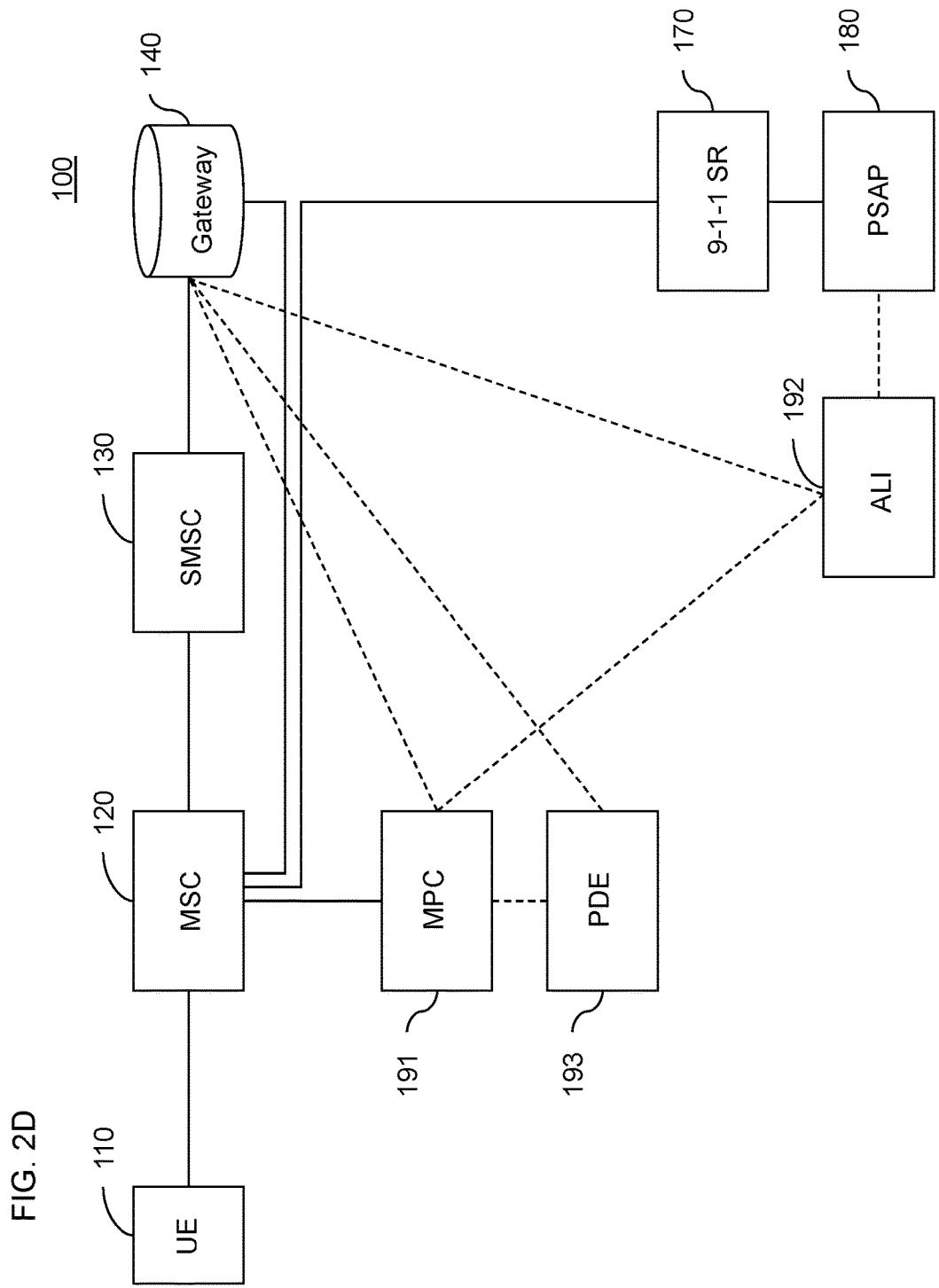

Although FIG. 2A illustrates an exemplary implementation of emergency call network, the invention is not limited thereto, and other implementations for establishing a communication session are possible. For example, the communication session may be a VoIP call, but the invention is not limited to VoIP implementations as other audio call technologies can be used. In another example, the VPC 150 and ESGW 160 can be replaced by a proxy server and gateway server, respectively, as shown in FIG. 2B. In yet another example, the Gateway 140 establishes a communication session with the SR 170 directly, as shown in FIG. 2C. In yet another example, the communication session can be routed to the SR 170 through a MSC disposed between the Gateway 140 and SR 170, as shown in FIG. 2D.

Figure 3:
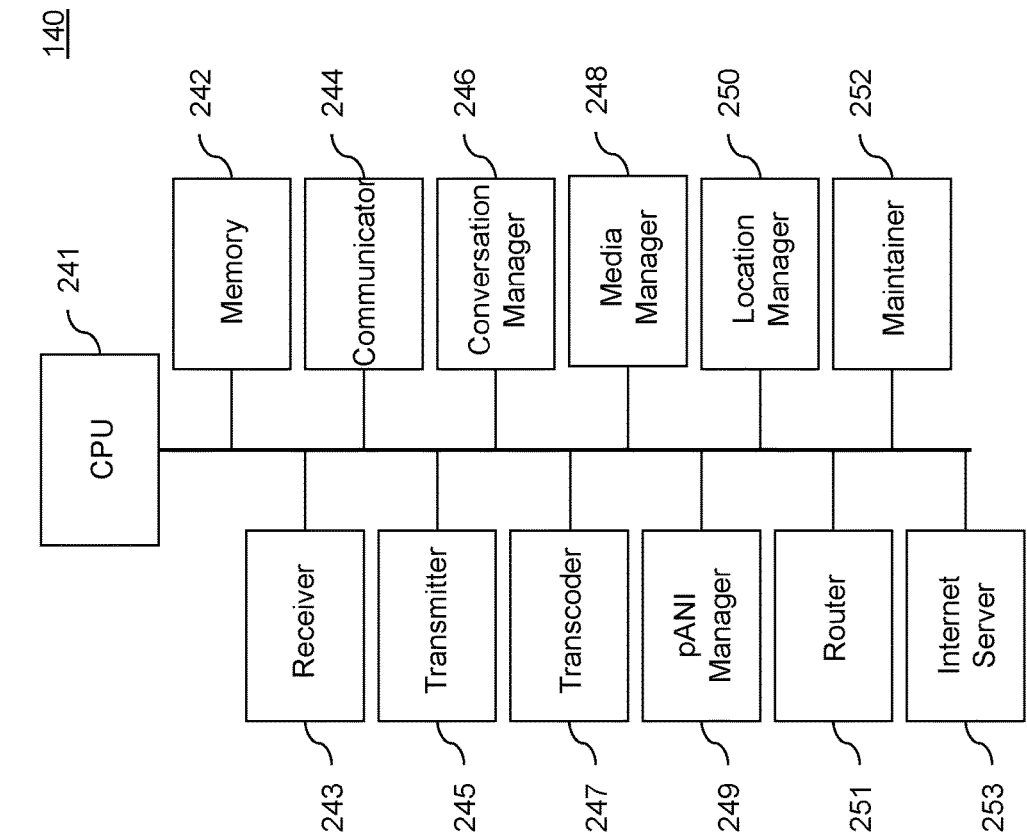
FIG. 3 is a block diagram that illustrates an exemplary gateway according to an embodiment of the present invention.

FIG. 3 is a block diagram that illustrates an exemplary gateway according to an embodiment of the present invention. The Gateway 140 is a computer having several hardware and software components that implement its functions.

The CPU 241 and memory 242 are conventional hardware components of a computer. The CPU 241 and memory 242 can be utilized by other components of the Gateway 140, the components communicating over a conventional communications bus or other communications means.

The receiver 243 and transmitter 245, and communicator 244 are software components of the Gateway 140. The receiver 243 and transmitter 245 use one or more communications ports of the Gateway 140 to bi-directionally communicate SMS text messages with the SMSC 130 (shown in FIG. 2A) using short message peer to peer protocol (SMPP). The receiver 243 and transmitter 245 can be implemented or referred to as separate software components or as an integrated transceiver (not shown).

Similar to the receiver 243 and transmitter 245, the communicator uses one or more communications ports of the Gateway 140 to establish an audio call with the VPC 150 (shown in FIG. 2A). Session initiation protocol (SIP) is used to establish a VoIP call with the VPC 150 (shown in FIG. 2A). The communicator 244 establishes and maintains a communication session with the PSAP 180. The communicator 244 can also receive incoming calls from the PSAP 180.

The remaining components of the Gateway 140 are also primarily implemented as software components. The communications manager 246 is a software application that manages communication sessions for the Gateway 140. Upon receipt of a SMS text message, the conversation manager 246 can determine whether the message originates from a telephone number which is or is not currently in a communication session. The communications manager 246 can maintain a table of communication sessions with the telephone number of the caller for each session. When a message is received, the communications manager 246 checks the telephone number of the message sender against the telephone numbers of the existing communication sessions. If needed, the communication manager 246 can establish a new communication session with the PSAP 180 through the communicator 244.

In addition, conversation manager 246 receives updates with respect to the status of communication sessions. For example, communicator 244 can notify the conversation manager 246 of the status of a communication session such as the termination of a communication session. In another example, the conversation manager 246 can verify a communication session with the PSAP 180 by sending a preprogrammed message to the PSAP 180 and receiving an authorization message in response to the preprogrammed message.

As discussed above, the caller's location information is used by the Gateway 140 to determine which PSAP should receive the SMS text message. The router 251 is a software application that is invoked by conversation manager 246 to query the wireless network for the caller's location information, such as a cell ID. Queries for the cell ID are sent to the MSC 120. Alternatively, the MPC 191 or PDE 193 can be queried for the caller's location. The caller's location information can be the caller's actual location or the location of the cell and sector currently serving the caller. The router also accesses a mapping that associates location information, such as cell ID, to the PSAP that should get the initial SMS text message that is stored in Gateway 140.

As also discussed above, a pANI is assigned to the UE. The pANI manager 249 is a software application that is invoked by the conversation manager 246 to assign a pANI to the caller. A pool of pANIs is maintained for each PSAP. When a communication session is established, and which PSAP should get the call is determined based on the location of the caller, a pANI is allocated from the pool associated with that PSAP. The pANI is associated with the communication session and is placed in the signaling to the PSAP establishing the audio call. Upon termination of the communication session, the pANI and other allocated resources can be released.

The transcoder 247 is a software application that bi-directionally translates between text message and tone message formats, such as Baudot or ASCII tones. SMS text messages received from the receiver 243 can be transcoded to tones. Similarly, tone messages received on the communication session with the PSAP 180 can be transcoded to SMS text messages. At the receiver 243, SMS text messages from the caller can be queued and routed to the transcoder 247. At the transmitter 245, SMS text messages originating from call taker can be received from the transcoder 247 and can be routed to the caller.

The Gateway 140 also includes a media manager 248 that is a software application that receives MMS messages containing one or more pictures or videos. For MMS messages, media manager 248 can store the media, and can generate a message containing a retrieval code or URL that can be routed to the call taker. In other words, the media manager 248 can invoke the Internet server 253 that is a software application that enables the Gateway 140 to function as an Internet server. The Internet server 253 also stores the pictures and videos contained in MMS messages, and makes them accessible to the call takers using a retrieval code or URL. For example, the call taker at PSAP 180 can retrieve the picture/video with the retrieval code and/or by accessing a URL. Some PSAPs may be unable to access a picture or video message. Accordingly, this functionality can provisioned on or off per PSAP. When off, the PSAP can route a no-media message to the media manager 248 of the Gateway 140.

The location manager 250 is a software application that handles requests for the caller's location information received from the PSAP 180. The location manager 250 may be invoked by the PSAP 180 at any time during the communication session. In order to retrieve the caller's location, the location manager 250 invokes the router 251 to query the wireless network. When a location query is received by the location manager 250, the pANI in the query is used to identify the communication session.

The maintainer 252 is a software application that monitors and maintains the functionality of Gateway 140. The maintainer 252 can perform health checks and provide network monitoring functions for Gateway 140. In addition, the maintainer can also provide provisioning capability for the network, PSAP, pANI, cell id and other mapping tables in the gateway.

Figure 4:
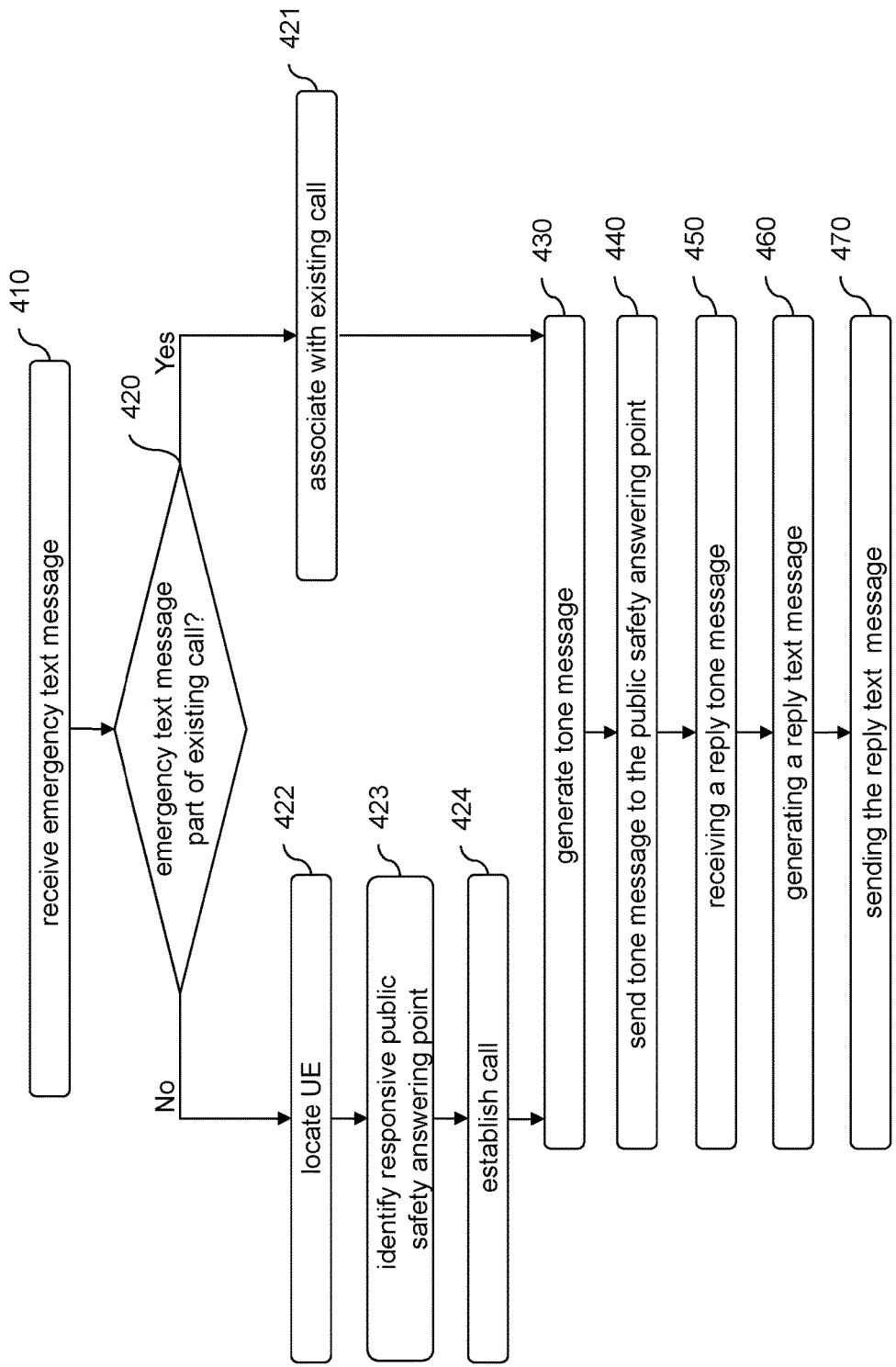
FIG. 4 is a flow diagram that illustrates an exemplary method for connecting with a public safety answering point in accordance with an embodiment of the present invention.

FIG. 4 is a flow diagram that illustrates an exemplary method for connecting with a public safety answering point according to the present invention.

At step 401, the Gateway 140 receives a caller's emergency text message. Upon receipt of the emergency text message, the Gateway 140 determines whether the emergency text message is part of an existing communication session. Here, the Gateway 140 checks the telephone number of the message sender against the telephone numbers of the existing communication sessions. When the emergency text message is determined to be part of an existing communication session, the Gateway 140 associates the text message with the communication session of the caller, as shown at step 421. On the other hand, when the emergency text message is determined not to be part of an existing communication session, the Gateway 140 queries the wireless network for the caller's location information, such as the caller's cell ID, at step 422. With the caller's location information, the Gateway 140 identifies a responsive PSAP 180 to receive the emergency text message, as shown at step 423. Next, at step 424, the Gateway 140 establishes a new communication session between the caller and the call taker at responsive PSAP 180.

After the emergency text message is associated with an existing communication session (step 421) or a new communication session is established (step 424), the Gateway 140 generates an emergency tone message corresponding to the emergency text message at step 430. The Gateway 140 then routes the emergency tone message to the responsive PSAP 180 at step 440. Next, at step 450, the Gateway 140 receives a reply tone message from the responsive PSAP 180. In turn, the Gateway 140 generates a reply text message corresponding to the reply tone message, at step 460. Lastly, the Gateway 140 routes the reply text message to the caller at step 470.

As can be understood from the above description, the present invention can use TTYs to provide SMS capability by interworking the SMS message system with the TTY support system in the emergency call process, thus allowing a wireless caller to text to the PSAP in at least a similar manner as the caller would send a text message to another UE. Similarly, the PSAP can use its TTY in a similar manner as any other TTY call.

Accordingly, the present invention is directed to a system and method for delivering SMS text messages to emergency call centers that exploits existing infrastructure. This has the advantage of allowing a rapid deployment, with minimal cost at the PSAP, while using normal commercial elements in the origination network. The proposed system and method is advantageous because large system upgrades are not required.

The foregoing description serves to explain the invention by way of example, but it should be understood that the invention is not limited to the exemplary embodiments described herein. For example, although the invention is described within the context of emergency call centers, it is equally applicable to non-emergency services such as 3-1-1 services and the like. In addition, the invention is described as using SMS text messaging, but is also applicable to any text service. Similarly, the invention is described as using TTYs, but is also applicable to any tone-based system. In yet another example, although the invention is described within the context of sending text messages from a cellular phone, it is equally applicable to text messages and e-mail messages from smartphones, tablets, laptops, and other computing devices.

It will be apparent to those skilled in the art that various modifications and variations can be made in the system and method for delivering short message service text to call centers of the present invention without departing form the spirit or scope of the invention. Thus, it is intended that the present invention cover the modifications and variations of this invention provided they come within the scope of the appended claims and their equivalents.

What is claimed is:

1. A communications system comprising:
a gateway for routing communications between callers' mobile communications devices and call centers, the gateway being configured to:
translate an incoming communication that is based on a text message generated by a caller's mobile communications device into a tone-based message for receipt by a call center, wherein a first format of the text message generated by the caller's mobile communications device is different from a second format of the tone-based message; and
determine whether the incoming communication is an initial message or is otherwise part of an existing communication session, such that the gateway routes the translated tone-based message that is a part of an existing communication session to the call center handling the existing communication session,
wherein the message generated by the caller's mobile communications device is a multimedia message service (MMS) message having a multimedia content, and wherein the tone-based message includes tone-based data alerting the call center that the multimedia content is available.

2. The communications system of claim 1, wherein the gateway comprises a table of communication sessions with an identifier of the caller for each communication session, and wherein the gateway determines whether the incoming communication is an initial message or is otherwise part of an existing communication session by accessing the table.

3. The communications system of claim 1, wherein the multimedia content is stored at the gateway such that the content is retrievable by the call center.

4. The communications system of claim 1, wherein the tone-based message is a teletypewriter (TTY) message.

5. The communications system of claim 1, wherein the incoming communication is received from an intermediary entity between the caller's mobile communications device and the gateway.

6. The communications system of claim 5, wherein the intermediary entity is a short message service center (SMSC).

7. The communications system of claim 5, wherein the incoming communication includes at least a portion of the text message generated by the caller's mobile communications device and an additional information generated by the intermediary entity.

8. The communications system of 36, wherein the additional information is a destination identifier associated with the gateway.

9. The communications system of claim 1, wherein termination of the existing communication session is controlled by the call center.

10. The communications system of claim 9, wherein the existing communication session is terminated after receiving a termination request from the call center.

11. A method of text messaging between a caller's mobile communications device and a call center via a gateway, comprising:
    receiving an incoming communication that is based on a text message generated by the caller's mobile communications device;
    generating a tone-based message for receipt by the call center based on the incoming communication, wherein a first format of the text message generated by the caller's mobile communications device is different from a second format of the tone-based message; and
    determining whether the incoming communication is an initial message or is otherwise part of an existing communication session, such that the gateway routes the generated tone-based message that is a part of an existing communication session to the call center handling the existing communication session,
    wherein the text message generated by the caller's mobile communications device is a multimedia message service (MMS) message having a multimedia content, and wherein the tone-based message includes tone-based data alerting the call center that the multimedia content is available.

12. The method of claim 11, wherein the gateway comprises a table of communication sessions with an identifier of the caller for each communication session, and wherein the determination of whether the incoming communication is an initial message or is otherwise part of an existing communication session includes accessing the table.

13. The method of claim 11, wherein the multimedia content is stored at the gateway such that the content is retrievable by the call center.

14. The method of claim 11, wherein the tone-based message is a TTY message.

15. The method of claim 11, wherein the incoming communication is received from an intermediary entity between the caller's mobile communications device and the gateway.

16. The method of claim 15, wherein the intermediary entity is an SMSC.

17. The method of claim 11, wherein the incoming communication includes at least a portion of the text message generated by the caller's mobile communications device and an additional information generated by the intermediary entity.

18. The method of claim 17, wherein the additional information is a destination identifier associated with the gateway.

19. The method of claim 11, further comprising terminating the existing communication session after receiving a termination request from the call center.

20. A non-transitory, computer-readable storage medium storing instructions, an execution of which in a computer system causes the computer system to perform operations comprising:
    receiving an incoming communication that is based on a text message generated by a caller's mobile communications device;
    generating a tone-based message for receipt by a call center based on the incoming communication, wherein a first format of the text message generated by the caller's mobile communications device is different from a second format of the tone-based message; and
    determining whether the incoming communication is an initial message or is otherwise part of an existing communication session, such that the gateway routes the generated tone-based message that is a part of an existing communication session to the call center handling the existing communication session,
    wherein the text message generated by the caller's mobile communications device is a multimedia message service (MMS) message having a multimedia content, and wherein the tone-based message includes tone-based data alerting the call center that the multimedia content is available.

* * * * *